United States Patent
Teng et al.

(10) Patent No.: US 7,973,738 B2
(45) Date of Patent: Jul. 5, 2011

(54) ELECTRONIC DEVICES HAVING COMPLEMENTARY DUAL DISPLAYS

(75) Inventors: Albert Teng, Cupertino, CA (US); Jack Yuan, Cupertino, CA (US)

(73) Assignee: Spring Design Co. Ltd., Taipei (TW)

( * ) Notice: Subject to any disclaimer, the term of this patent is extended or adjusted under 35 U.S.C. 154(b) by 512 days.

(21) Appl. No.: 11/702,788

(22) Filed: Feb. 5, 2007

(65) Prior Publication Data

US 2008/0068294 A1 Mar. 20, 2008

Related U.S. Application Data

(63) Continuation-in-part of application No. 11/602,539, filed on Nov. 20, 2006, now Pat. No. 7,742,012.

(60) Provisional application No. 60/848,538, filed on Sep. 29, 2006, provisional application No. 60/844,979, filed on Sep. 14, 2006, provisional application No. 60/850,013, filed on Oct. 6, 2006.

(51) Int. Cl.
*G09G 5/00* (2006.01)
(52) U.S. Cl. ............................. 345/1.3; 345/3.1; 345/3.4
(58) Field of Classification Search ............ 345/1.1–1.3, 345/3.1, 3.4
See application file for complete search history.

(56) References Cited

U.S. PATENT DOCUMENTS

| | | | |
|---|---|---|---|
| 5,488,572 A | 1/1996 | Belmont | |
| 5,493,335 A | 2/1996 | Parulski et al. | |
| 5,847,698 A | 12/1998 | Reavey et al. | |
| 6,336,161 B1 | 1/2002 | Watts | |
| 6,353,700 B1 | 3/2002 | Zhou | |
| 6,628,244 B1 | 9/2003 | Hirosawa et al. | |
| 6,931,265 B2 | 8/2005 | Reyes et al. | |
| 7,748,634 B1 | 7/2010 | Zehr et al. | |
| 2002/0067319 A1 | 6/2002 | Hensel | |
| 2002/0126133 A1 | 9/2002 | Ewins | |
| 2002/0149541 A1 * | 10/2002 | Shin | 345/3.1 |
| 2002/0158812 A1 * | 10/2002 | Pallakoff | 345/5 |
| 2003/0011534 A1 * | 1/2003 | Rengan et al. | 345/1.1 |
| 2003/0160771 A1 | 8/2003 | Fraser et al. | |

(Continued)

FOREIGN PATENT DOCUMENTS

EP 1205824 A2 5/2002

OTHER PUBLICATIONS

PCT International Search Report mailed Mar. 25, 2008, re PCT/US2007/078209.

(Continued)

*Primary Examiner* — Kevin M Nguyen
*Assistant Examiner* — Jonathan Boyd
(74) *Attorney, Agent, or Firm* — Fenwick & West LLP

(57) ABSTRACT

Methods for controlling complementary dual displays for use with an electronic device are presented including: sending a video signal to a first display, wherein the first display is a refresh-based, high frame rate display; displaying the video signal on the first display; and printing a frame of the video signal to a second display, wherein the second display is a bistable, low frame rate display, the printing including, loading a portion of a current frame of the video signal into a frame buffer, and displaying the current frame of the video signal to a second display, such that a bistable static image is displayed on the second display.

33 Claims, 10 Drawing Sheets

U.S. PATENT DOCUMENTS

| | | |
|---|---|---|
| 2004/0190080 A1* | 9/2004 | Kodama et al. ............... 358/474 |
| 2004/0196210 A1* | 10/2004 | Nagatsuka et al. ............ 345/1.1 |
| 2004/0225613 A1 | 11/2004 | Narayanaswami et al. |
| 2004/0257367 A1 | 12/2004 | Smith et al. |
| 2005/0225556 A1* | 10/2005 | Booth ........................... 345/537 |
| 2006/0017659 A1* | 1/2006 | Ogawa et al. ................... 345/30 |
| 2006/0050090 A1* | 3/2006 | Ahmed et al. ................. 345/660 |
| 2006/0077127 A1 | 4/2006 | Sampsell et al. |
| 2006/0083194 A1 | 4/2006 | Dhrimaj et al. |
| 2006/0146056 A1 | 7/2006 | Wyatt |
| 2006/0161977 A1* | 7/2006 | Jung et al. ........................ 726/21 |
| 2006/0187142 A1* | 8/2006 | Lesniak ........................ 345/1.1 |
| 2006/0197724 A1* | 9/2006 | Sakai ............................. 345/87 |
| 2007/0118671 A1* | 5/2007 | Ganti ................................ 710/1 |
| 2007/0174918 A1* | 7/2007 | Hirose et al. .................... 726/26 |
| 2007/0182663 A1* | 8/2007 | Biech ............................ 345/1.1 |
| 2008/0033996 A1* | 2/2008 | Kesari ........................ 707/104.1 |
| 2008/0080010 A1* | 4/2008 | Korst ............................ 358/401 |

OTHER PUBLICATIONS

PCT Written Opinion of the ISA mailed Mar. 25, 2008, re PCT/US2007/078209.

PCT International Search Report & Written Opinion mailed Mar. 25, 2008 re PCT/US2007/078208.

Chinese First Office Action, Chinese Application No. 200780034341.9, Mar. 31, 2011, 21 pages.

* cited by examiner

ELECTRONIC DEVICES HAVING COMPLEMENTARY DUAL DISPLAYS

CROSS REFERENCE TO RELATED APPLICATIONS

The present application is a Continuation-in-Part of co-pending U.S. patent application Ser. No. 11/602,539, entitled, "METHODS FOR CONTROLLING COMPLEMENTARY DUAL DISPLAYS," filed on Nov. 20, 2006, which is incorporated herein by reference.

The present application is related to the following application, which is incorporated herein by reference: Commonly assigned U.S. patent application Ser. No. 11/702,789 entitled "ELECTRONIC DEVICES HAVING COMPLEMENTARY BISTABLE AND REFRESH-BASED DISPLAYS," filed on even date herewith by the same inventors herein.

PRIORITY CLAIM TO PROVISIONAL APPLICATION

A claim for priority is hereby made under the provisions of 35 U.S.C. §119 for the present application based upon U.S. Provisional Application No. 60/848,538, filed on Sep. 29, 2006, which is incorporated herein by reference; upon U.S. Provisional Application No. 60/844,979, filed on Sep. 14, 2006, which is incorporated herein by reference; and upon U.S. Provisional Application No. 60/850,013 filed on Oct. 6, 2006, which is incorporated herein by reference.

BACKGROUND

LCD-based electronic devices such as Ultra Mobile PC (UMPC), laptops/PCs, personal digital assistants (PDAs), cellular phones, portable digital media players, and the like are becoming ubiquitous in modern technological societies. These devices offer specialized functionality in form factors small enough to carry in a pocket or some other small carrying bag. At least one reason why these types of devices are so popular is because display technology, which provides a convenient user interface, has advanced to a point where relatively small form factors are efficient and inexpensive. Indeed, even the most inexpensive portable electronic devices now include high frame rate color displays. However, conventional displays are not without some disadvantages.

Typically, a PDA may include a refresh-based, high frequency (REHF) display for displaying user selected information. One example of an REHF display is a liquid crystal display (LCD). LCDs have many desirable characteristics including high frame rates which provide for a satisfying visual experience when rapidly switching between screens or when scrolling across a screen. However, typical displays having high screen refresh rates may suffer from poor readability because backlights, which are required in those displays, may be adversely affected by ambient lighting conditions. Eye strain is commonly reported by users and has been documented in some medical literature. Users of UMPCs or PDAs are familiar with the poor readability of LCDs under bright light or direct sunlight. In some examples, shading the screen or moving to a darker environment may be necessary to read an LCD.

In order to overcome the shortcomings of an LCD, bistable, low frequency (BILF) displays may be utilized instead of an LCD. One example of a BILF display is and electronic paper display (EPD). EPDs utilize a material called electronic ink and are commercially available under the trade name E INK®. EPDs are ideally suited for flexible display applications due to their thin form factor and inherent flexibility. EPDs provide an image stable reflective display technology that uses ultra-low power but is easily read under any lighting condition including direct sunlight. In addition, EPDs provide a bistable display and unlike LCDs, an image on an EPD looks the same from all viewing angles. Further, EPDs will not distort when touched or flexed, making EPDs the ideal display medium for flexible displays and portable devices. EPDs however, cannot, in many examples, completely replace LCDs. At least one reason is because EPDs typically have a low frame rate. As noted above, conventional LCDs are typically configured with high frame rates, which may serve to enhance a user's viewing experience especially when rapidly scrolling through multiple displays. In addition, using a mouse requires high frame rates so that the mouse pointer appears to have smooth movement across a screen. Furthermore, currently, a majority of reading content is created for viewing with an REHL display application such as an LCD application while few applications are written for BILF displays such as an EPD. This trend is likely to continue. It may, therefore, be advantageous to easily display the output of existing REHF display applications on BILF displays such as an EPD.

It may, therefore, be desirable to provide a complementary display to conventional portable electronic device or desktop PC displays which provide a highly readable display that overcomes harsh ambient light conditions, reduces eye strains and does not overly diminish battery life. The method and the heterogeneous display hardware design can deliver many new classes of EPD usage models, including: (1) the capability to extend (or migrate) an REHF-based application to a BILF display for better reading experience where a user may also browse the pages on BILF display without changing the application (in this example, a BILF display could be tightly integrated with an REHF display through system bus or loosely linked through an external device); and (2) the ability to create dual-display aware applications that can take advantages of the unique benefits of both BILF and REHF displays at the same time. These methods can enable extreme ease-of-use involving two heterogeneous displays without traditional "file synch" model that requires multiple steps of selecting files, transfer files and then opening files and then browsing to the desired page. As such, methods for controlling complementary bistable and refresh-based displays are provided herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Therefore, methods for controlling complementary dual displays for use with an electronic device are presented including: sending a video signal to a first display, wherein the first display is a refresh-based, high frame rate display; displaying the video signal on the first display; and printing a frame of the video signal to a second display, wherein the second display is a bistable, low frame rate display, the printing including, loading a portion of a current frame of the video signal into a frame buffer, and displaying the current frame of the video signal to a second display, such that a high resolution static image is displayed on the second display. In some embodiments, methods further include: loading a zoom buffer, the zoom buffer populated with a number of enlarged zoom frames and a number of reduced zoom frames based on the current frame; and selecting a zoom frame for display on the second display. In some embodiments, methods further include: on a pan command for the second display, determining whether a displayed frame is the zoom frame displayed on the second display that is one of the number of enlarged zoom frames; if the displayed frame is the zoom frame displayed on the second display that is one of the number of enlarged zoom frames, displaying the zoom frame that corresponds with the pan command, else selecting a panned page from the first display and printing the panned page on the second display. In some embodiments, methods further include: loading a composite buffer with a composite frame, the composite frame representing a composite image of at least two frames stored in the frame buffer.

In other embodiments, methods for controlling complementary dual displays for use with an electronic device are presented including: sending a first video signal to a first display wherein the first display is a refresh-based high frame rate display; displaying the first video signal on the first display; sending a second video signal to a second display wherein the second display is a bistable low frame rate display; and displaying the second video signal on the second display at the low frame rate. In some embodiments, the second video signal is sent over a wireless connection to an external second display with a reading card and the reading card can send page up/down commands back to read the content from the application resided at the device of the first display. In some embodiments, methods further include: on a clean command for the second display, refreshing a current frame such that artifacts are reduced. In some embodiments, on a wipe command for the second display, wiping the second display such that the second display is blank. In some embodiments, the second video signal includes status information, wherein the status information is selected from the group consisting of: power information, network connection information, signal strength information, user configuration information, display wakefulness information, date information, time information, application information, and system information.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Figure 1:
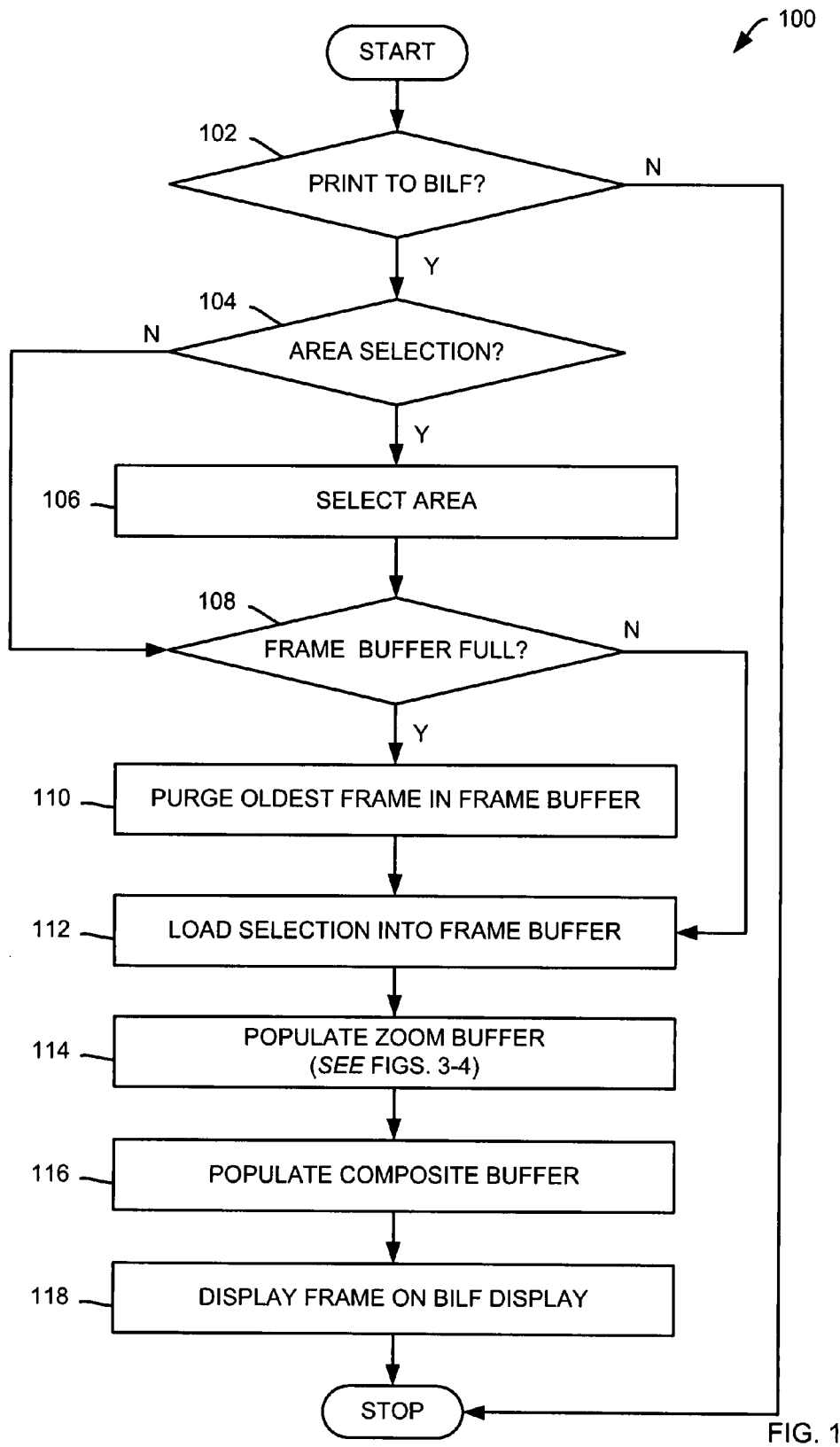
FIG. 1 is an illustrative flowchart for printing to a bistable, low frequency (BILF) display in accordance with embodiments of the present invention.

FIG. 1 is an illustrative flowchart 100 for printing to a bistable, low frequency (BILF) display in accordance with embodiments of the present invention. At a first step 102, the method determines whether printing to a BILF display is requested. Typically, in a dual display system, an REHF display (i.e. LCD) is utilized to navigate a user interface. As noted above, high frame rates provide for a satisfying visual experience when rapidly navigating between screens or when scrolling across a screen whereas low frame rates may not provide as satisfying an experience. Thus, the method contemplates that, as an initial condition, an REHF display is in use when printing to a BILF display is requested. If printing is not requested at a step 102, the method ends. If printing is requested at a step 102, the method continues to a step 104 to determine whether an area selection is desired. As may be appreciated, a user may desire to print only a portion of a currently displayed image on a REHF display. As such, in some embodiments, a user may select a portion of a displayed image for printing to a BILF display. If an area selection is desired at a step 104, the method continues to a step 106 to select an area for printing whereupon the method continues to a step 108. If an area selection is not desired at a step 104, the method continues to a step 108 to determine whether a frame buffer is full.

In some embodiments, a frame buffer may be utilized to store currently printed and previously printed frames. Frame buffers are generally well-known in the art and may be utilized without limitation without departing from the present invention. In one embodiment, the frame buffer is configured to store at least four frames, more preferably 5 to 10 frames, still more preferably greater than 10 frames. A frame represents a bistable static image. It may be appreciated that the number of frames stored is largely a function of memory capacity. That is, in some embodiments, many more frames may be stored without departing from the present invention. If the method determines, at a step 108, that the frame buffer is full, then the oldest frame in the frame buffer is purged at a step 110. Thus, in some embodiments, frame buffers may be configured as first in first out (FIFO) buffers. The method then continues to a step 112. If the method determines, at a step 108, that the frame buffer is not full, then the method continues to a step 112 to load the selection or image into the frame buffer. The method then populates a zoom buffer at a step 114. Zoom buffers will be discussed in further detail below for FIGS. 34 below.

The method continues, at a step 116, to populate a composite buffer. A composite buffer may be utilized to provide a user with an indication of what resides in a frame buffer. An image representing a composite image of at least the last two frames stored in the frame buffer may be loaded into a composite buffer. Each time a new image is selected for printing to a BILF display, a new composite image may be loaded into the composite buffer. Furthermore, as may be appreciated, if a frame buffer contains more than four images, more images may be utilized to populate a composite buffer with other composite images in some embodiments. Thus, a part of, or all of a frame buffer may be represented with composite images without departing from the present invention.

After the method populates a composite buffer at a step 116, the method continues, at a step 118, to display the frame that was loaded into the frame buffer at a step 112. The method then ends. It may be appreciated that printing to a BILF display as contemplated by flowchart 100 results in a high static image displayed on the BILF display that was previously displayed and continues to be displayed on an REHF display. A user may then navigate on the REHF display while maintaining a bistable static image on the BILF display. In some embodiments, a user may wish to migrate an application between a BILF display and an REHF display. Thus, migration may provide for switching either the entire screen or the application focus between the BILF and REHF.

Figure 2:
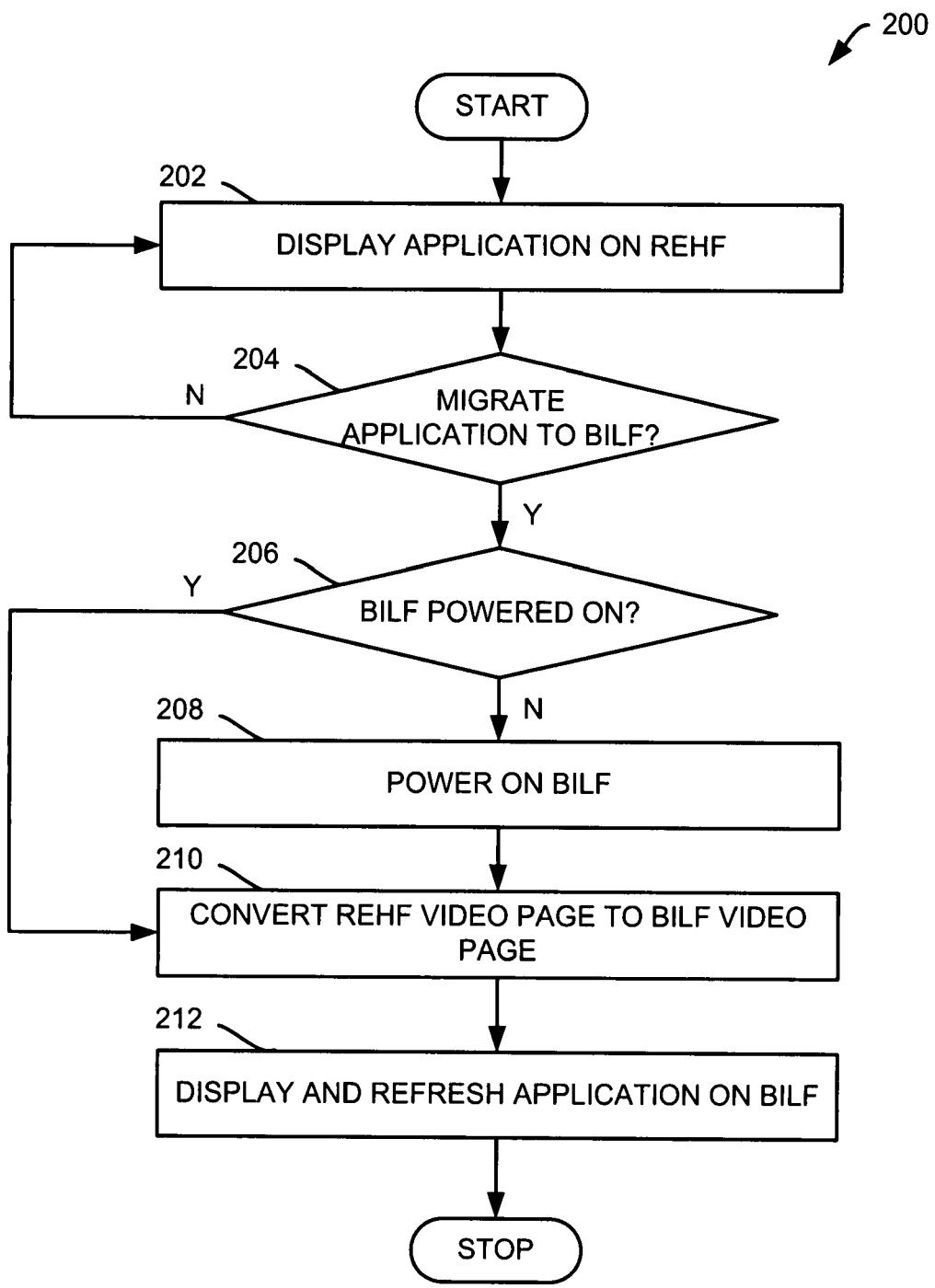
FIG. 2 is an illustrative flowchart for migrating a display between a BILF and a REHF display in accordance with embodiments of the present invention.

FIG. 2 is an illustrative flowchart 200 for migrating a display between a BILF display and a REHF display in accordance with embodiments of the present invention. At a first step 202, an application is being displayed on an REHF display. At a next step 204, the method determines whether migrating an application to a BILF display is required. Thus, although typically, a user may prefer to navigate an application over a REHF display, there may be instances where it is desirable to navigate an application over a BILF display, such as with a reading application for example. The migration of an REHF-based application to a bistable display tends to enhance reading experience and provides a user with a capability to browse reading pages on the bistable display after the migration. If the method determines, at a step 204, that a migration is not required, the method continues to a step 202 to continue displaying the application on an REHF display. If the method determines, at a step 204, that a migration is required, the method determines whether a BILF display is powered on. If method determines that the BILF display is not powered on at a step 206, the method then powers on the BILF display at a step 208. The method then continues to a step 210 to convert the REHF display video signal to a BILF display video signal. In some embodiments, a preview screen may be displayed on an REHF display before sending to a BILF display. As may be appreciated, resolution, color and frame rate differences must be resolved before migrating a signal to a BILF display. Any number of conversion methods known in the art may be utilized without departing from the present invention. As may be appreciated, video signals sent to the BILF in any manner well-known in the art without departing from the present invention. Thus, in some embodiments, a wired connection may include: PCMCIA, SDIO, USB, Serial, and DVI. In other embodiments, a wireless connection may include: Bluetooth, 802.11a, 801.11b, 802.11g, 2.4 GHz wireless, IR wireless, and ultra wide band.

To illustrate an embodiment employing application migration and screen synch between two complimentary displays, the following steps illustrate a usage model that includes a smart-phone configured with an LCD and connected through Bluetooth link with an EPD device. Both displays are configured with similar resolution but the LCD is color and the EPD device is monochrome.

Step 1: Begin a reading application (like Microsoft Windows Mobile WORD) on the phone. In this condition, the application displays a first reading page on the smart-phone LCD while the EPD device remains blank.

Step 2: Press a key (mapped to a migration command) on the smart-phone side to start a screen-synch session. Migration turns the EPD device on and displays the first reading page on the EPD device in monochrome. In some examples, a best display color and best display resolution may be automatically configured upon sensing a type of device. In some examples, the smart-phone may enter a standby mode to conserve battery power.

Step 3: Press a key (mapped to a pagination command) on the EPD device to page up or down. Paging on the EPD displays a newly navigated page of the WORD application running at the smart-phone device. When paging is performed on the EPD, the smart-phone LCD can synch up immediately (although the newly navigated page may not be visible if the smart-phone is in a standby mode with the LCD turned off). Zooming a page to different font size may be also be accomplished on the EPD device side via a key mapped to a zoom command.

Step 4: Press a key (mapped to a search command) to search for a text string. For smart-phones having search capability, searching for a text string may be accomplished on the LCD mart-phone side. When a text string is found, a new page containing the first occurrence of the specified string may be displayed on the LCD. Meanwhile the EPD device may synch up to the same page in a few seconds. Reading may then resume at the EPD device.

Step 5: Press a key (mapped to a session termination command) to end the screen-synch session and to close read activity on the EPD device side. The smart-phone maintains the last browsed page on the EPD device prior to invoking the terminate session command.

Optional Configuration: In some embodiments, if the smart-phone includes an integrated EPD display, migration and screen synch operations can occur between the smart-phone LCD and the integrated EPD display. This means that the smart-phone can select one of the two EPD displays to be its complimentary display. The above examples illustrate methods that are configured to take advantage of EPD reading advantages on mainstream applications that are generally developed for use with an. Additionally, in some embodiments, an application configured to be aware of the presence of both an LCD and an EPD displays might be enabled to display different content of the same application on each display. Thus, for example, an LCD may be selected to display a table of contents of, for example, the Bible while an EPD may be selected to display the Book of John. Multi-tasking may also be enabled utilizing one (or more) EPDs in a reading session of one application while an attached LCD runs a different application each of which may provide access to application commands by selectively pressing a key mapped to a display selection command. Therefore, many configurations as described may be practiced without departing from the present invention.

At a next step 212, the method displays and refreshes a BILF display at a rate corresponding with the display rate of the particular BILF display. As may be appreciated, unlike printing to a BILF display, migrating to a BILF display results in a display from which an application may be navigated. That is, utilizing methods described herein, a BILF display may serve a purpose similar to conventional REHF displays. In one embodiment, video signals sent to an REHF display and to a BILF display may correspond with a common application. In some embodiments, video signals may correspond with a common screen or with different screens within the common application. Further, in some embodiments, screen commands or menus may be accessed from either an REHF display or a BILF display. Still further, in some embodiments, video signals sent to an REHF display and to a BILF display may correspond with different applications. Thus, in some embodiments, a user may navigate one or more applications of REHF and BILF displays more or less simultaneously.

Figure 3:
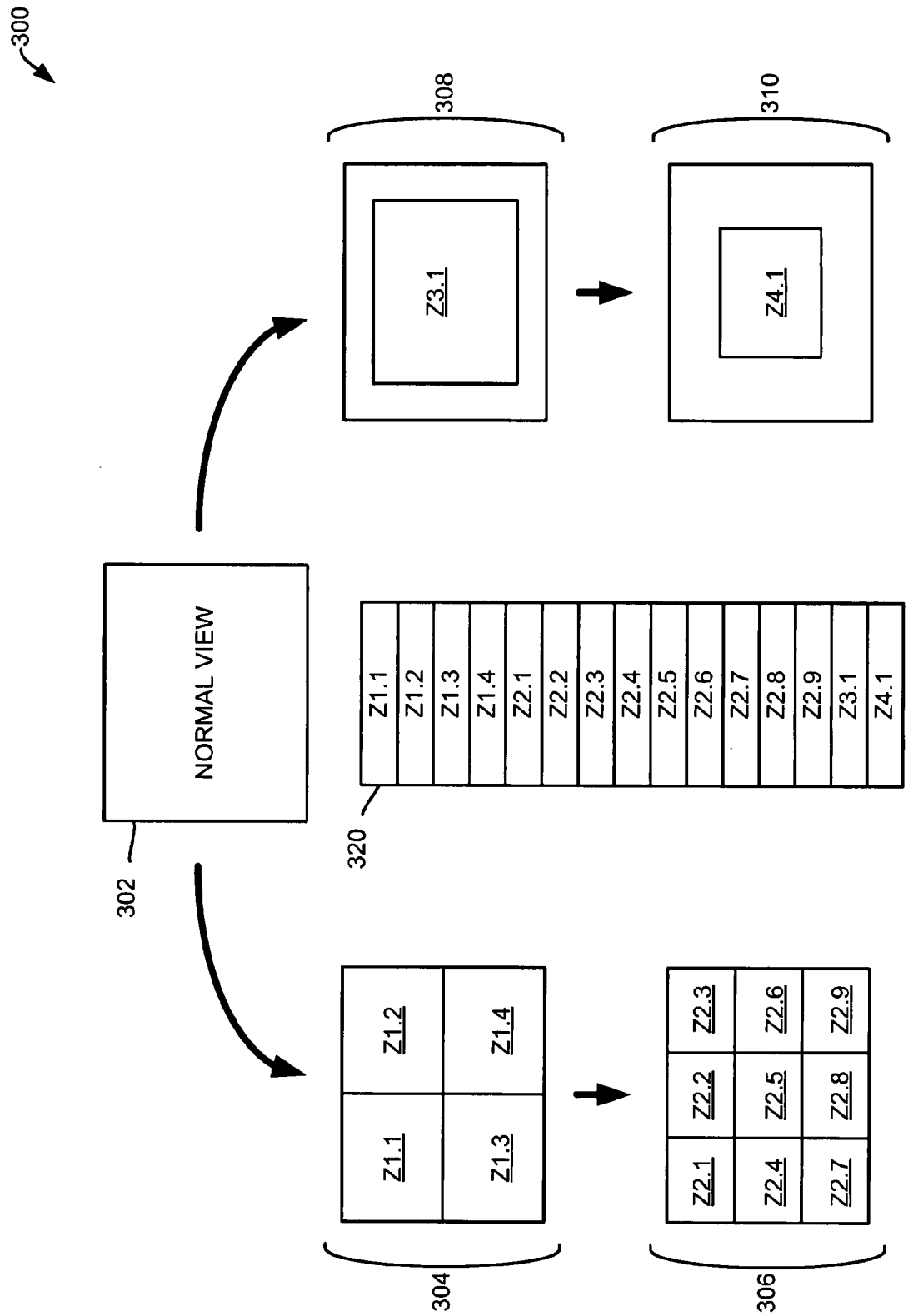
FIG. 3 is an illustrative representation of a number of zooms and a zoom buffer in accordance with embodiments of the present invention.

FIG. 3 is an illustrative representation of a number of zooms (304, 306, 308, and 310) and a zoom buffer 320 in accordance with embodiments of the present invention. As illustrated, normal view 302 may be resized to accommodate any number of zooms. It may be appreciated that zooming, in this manner, is relevant to printing an image to a BILF display as illustrated in flowchart 100 (see FIG. 1). Thus, in some embodiments, a first zoom 304 may include four images that may be zoomed to normal size for viewing; a second zoom 306 may include nine images that may be zoomed to normal size for viewing; a third zoom 308 may include a reduced image; and a fourth zoom 310 may include a further reduced image. Zooms may include ranges of approximately: 40 to 69%; 70 to 99%; 101 to 175%; and 176 to 300% without departing from the present invention. As may be appreciated, zooms illustrated are disclosed for clarity in understanding embodiments of the present invention. As such, any number of other zooms may be employed without departing from the present invention.

Zoom buffer 320 may be utilized to store all of the zoom frames. In one embodiment, zoom buffer may be configured to store at least 15 zoom frames. In some embodiments, zoom buffer may be configured to store more than 15 zoom frames. As may be appreciated, the number of zoom frames stored is directly related to image resolution and storage size. In some embodiments, zoom frames may be displayed sequentially as loaded into a zoom buffer. In other embodiments, zoom frames may be displayed non-sequentially. Thus, any method of accessing zoom frames may be utilized without departing from the present invention.

Figure 4:
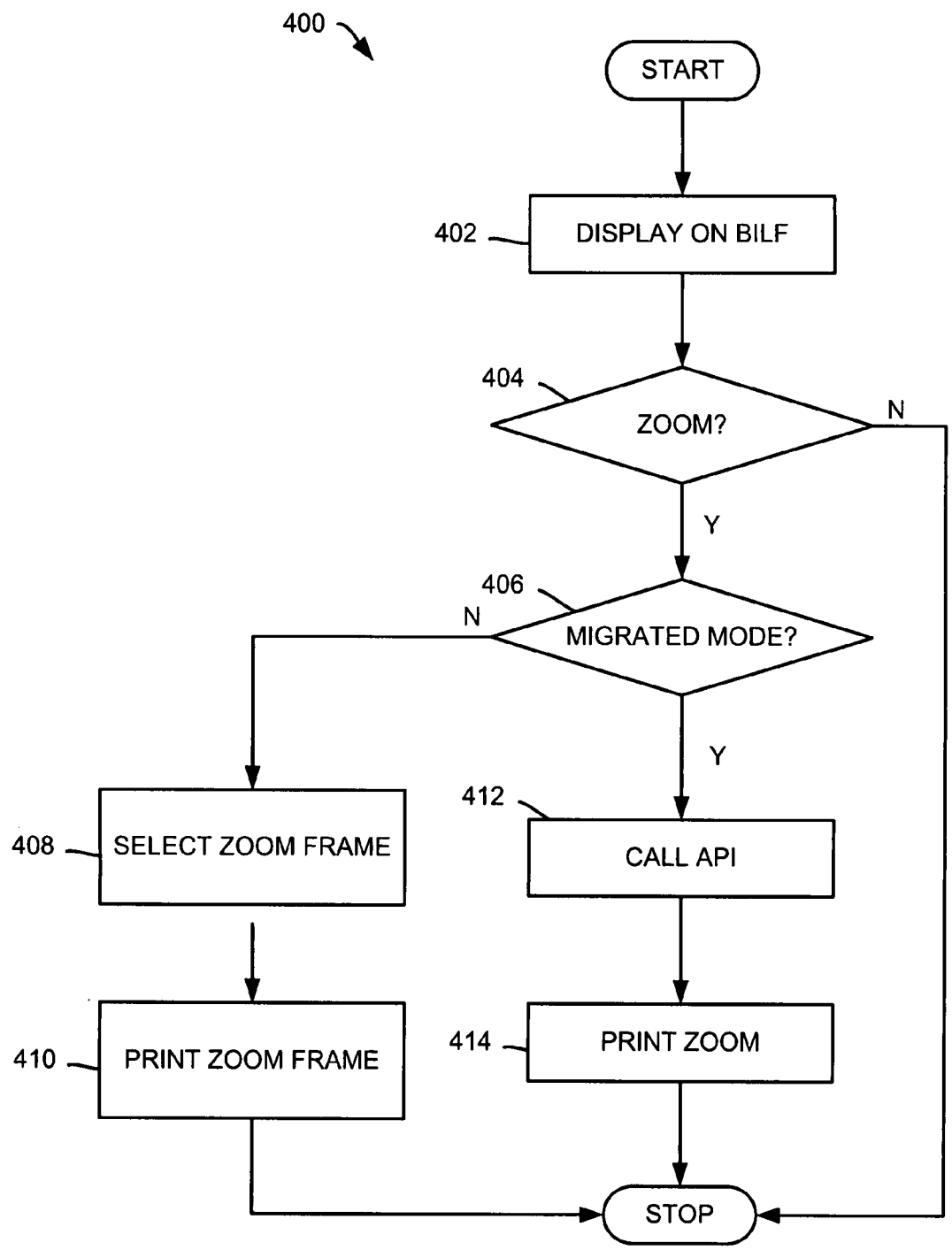
FIG. 4 is an illustrative flowchart for zooming on a BILF display in accordance with embodiments of the present invention.

FIG. 4 is an illustrative flowchart 400 for zooming on a BILF display in accordance with embodiments of the present invention. As noted above, when an image is printed to a BILF display, the image is a bistable static image. That is, when printing, an image is captured at a moment in time and is not updated unless a user initiates an update. As such, zooming requires specialized handling to accommodate this characteristic. At a step 402, an image is being displayed on a BILF display. At a next step, 404 the method determines whether zooming is required. Zooming may be user initiated in any number of manners well-known in the art without departing from the present invention. For example, in an embodiment, a zoom button embodied in a physical or virtual interface may serve to provide zoom input. If the method determines at a step 404 that a zooming is not required, the method ends. If the method determines at a step 404 that paging is required, the method determines whether the BILF display is in a migrated mode at a step 406. Migration is discussed in further detail above for FIG. 2. Notably, when a BILF display is in a migrated mode, the displayed application is navigable over the BILF display. When a BILF display is not in a migrated mode, then the displayed image is a static image which cannot be utilized to navigate an application.

If the method determines at a step 406 that the BILF display is in a migrated mode, then the method calls the application API at a step 412 for a requested zoom. The method then prints the zoomed image to the BILF display at a step 414, whereupon the method ends. In a migrated example, the BILF display is then refreshed at the display frequency rate. If the method determines at a step 406 that the BILF display is not in a migrated mode, then the method selects a desired zoom frame from a zoom buffer at a step 408. As noted above, any number of zoom frames may be selected from a zoom buffer (see FIG. 3). Thus, zoom frames may be selected sequentially or non-sequentially without departing from the present invention. The method then prints the selected zoom frame from a zoom buffer at a step 410 whereupon the method ends. In addition to displaying a selected zoom, zoom frames may also provide for panning features that would otherwise require a user to re-access an application that is being displayed on a BILF.

Figure 5:
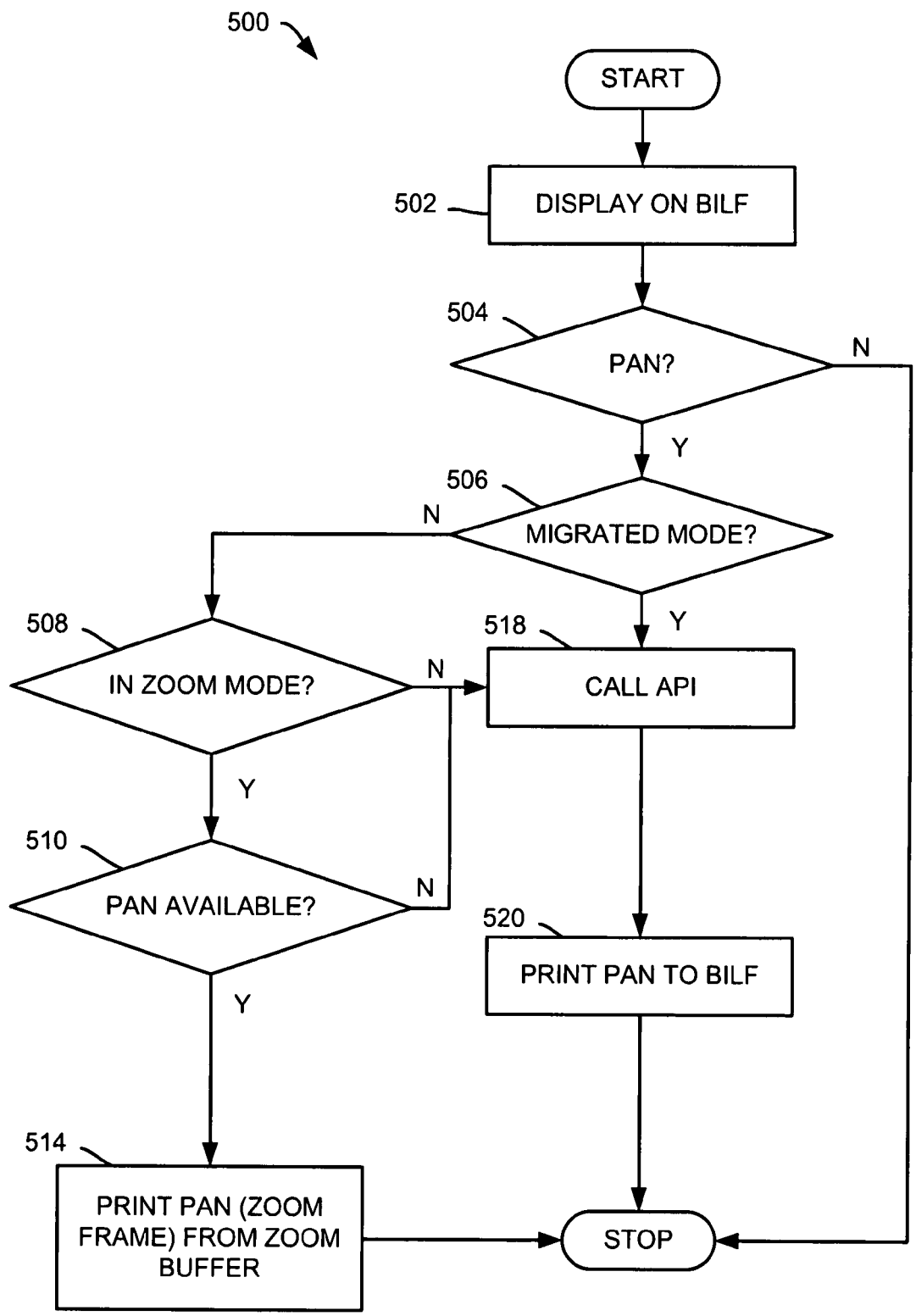
FIG. 5 is an illustrative flowchart for panning on a BILF display in accordance with embodiments of the present invention.

FIG. 5 is an illustrative flowchart 500 for panning on a BILF display in accordance with embodiments of the present invention. As noted above, when an image is printed to a BILF display, the image is a bistable static image. That is, when printing, an image is captured at a moment in time and is not updated unless a user initiates an update. As such, panning requires specialized handling to accommodate this characteristic. At a step 502, an image is being displayed on a BILF display. At a next step, 504 the method determines whether a pan is required. A pan may be user initiated in any number of manners well-known in the art without departing from the present invention. For example, in an embodiment, a pan button embodied in a physical or virtual interface may serve to provide panning input. If the method determines at a step 504 that a pan is not required, the method ends. If the method determines at a step 504 that a pan is required, the method determines whether the BILF display is in a migrated mode at a step 506. Migration is discussed in further detail above for FIG. 2. Notably, when a BILF display is in a migrated mode, the displayed application is navigable over the BILF display. When a BILF display is not in a migrated mode, then the displayed image is a static image which cannot be utilized to navigate an application.

If the method determines at a step 506 that the BILF display is in a migrated mode, then the method calls the application API at a step 518 for an appropriate pan. The method then prints the pan to the BILF display at a step 520 whereupon the method ends. In a migrated example, the BILF display is then refreshed at the display frequency rate. If the method determines at a step 506 that the BILF display is not in a migrated mode, then the method determines whether the BILF display is currently in a zoom mode. That is, whether a zoom frame is currently being displayed. If the method determines at a step 508 that the BILF display is not in a zoom mode, then no pan image is available and the method continues to a step 518. If the method determines at a step 508 that the BILF display is in a zoom mode, then a determination of whether a panned image is available is made at a step 510. As may be appreciated, some zoom frames may not include panned images. For example, a zoom frame having a zoom of less than 100% will not include any panned images. If the method determines at a step 510 that a pan is not available, then the method the method continues to a step 518. If the method determines at a step 510 that a pan is available, then the method may print a selected pan (i.e. zoom frame) from the zoom buffer whereupon the method ends.

Figure 6:
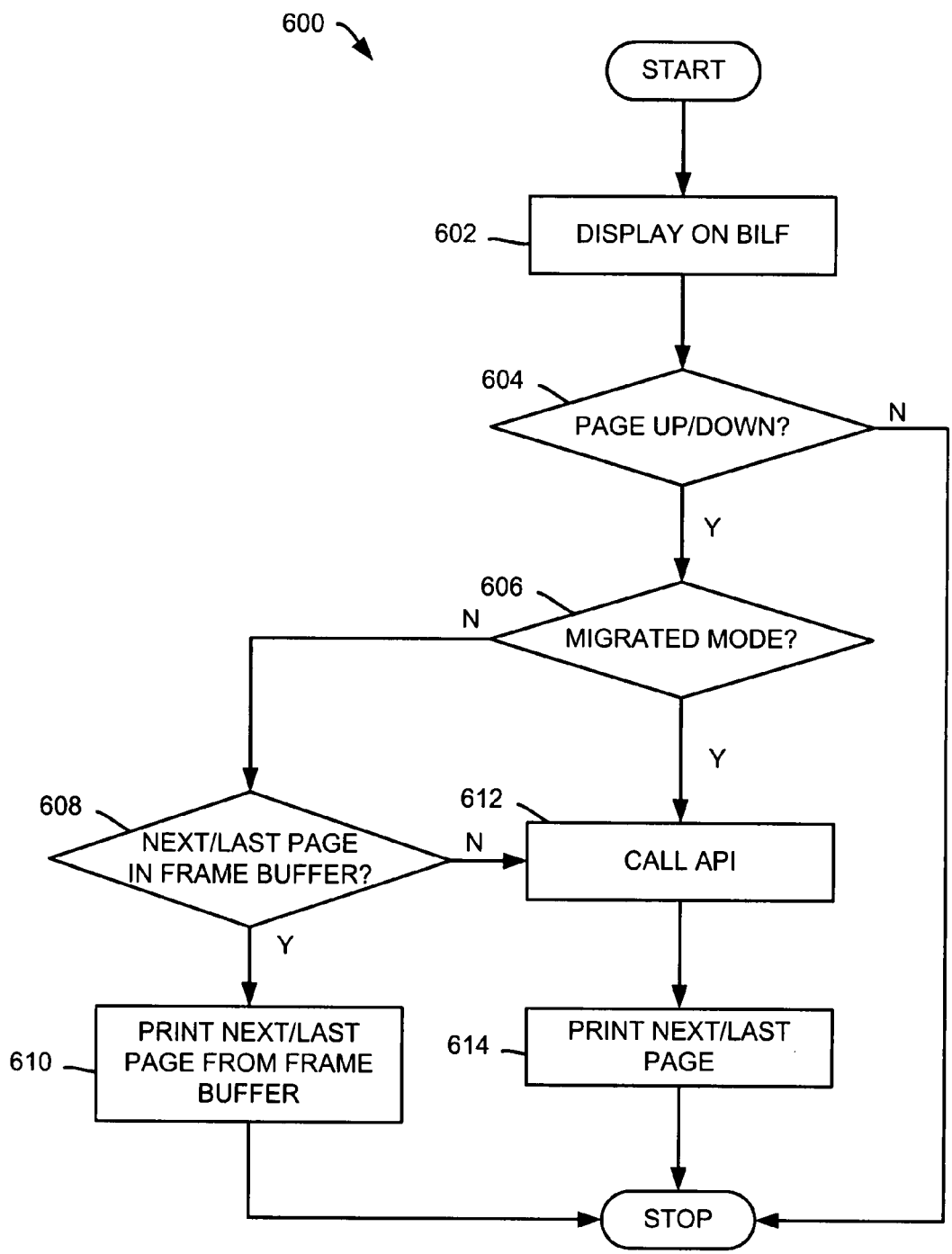
FIG. 6 is an illustrative flowchart for paging up and down on a BILF display in accordance with embodiments of the present invention.

FIG. 6 is an illustrative flowchart 600 for paging up and down on a BILF display in accordance with embodiments of the present invention. As noted above, when an image is printed to a BILF display, the image is a bistable static image. That is, when printing, an image is captured at a moment in time and is not updated unless a user initiates an update. As such, paging requires specialized handling to accommodate this characteristic. At a step 602, an image is being displayed on a BILF display. At a next step, 604 the method determines whether paging is required. Paging may be user initiated in any number of manners well-known in the art without departing from the present invention. For example, in an embodiment, a paging button embodied in a physical or virtual interface may serve to provide paging input. If the method determines at a step 604 that a paging is not required, the method ends. If the method determines at a step 604 that paging is required, the method determines whether the BILF display is in a migrated mode at a step 606. Migration is discussed in further detail above for FIG. 2. Notably, when a BILF display is in a migrated mode, the displayed application is navigable over the BILF display. When a BILF display is not in a migrated mode, then the displayed image is a static image which cannot be utilized to navigate an application.

If the method determines at a step 606 that the BILF display is in a migrated mode, then the method calls the application API at a step 612 for a requested page (i.e. next/last page). The method then prints the page to the BILF display at a step 614 whereupon the method ends. In a migrated example, the BILF display is then refreshed at the display frequency rate. If the method determines at a step 606 that the BILF display is not in a migrated mode, then the method determines whether the requested page is present in a frame buffer at a step 608. As noted above, a frame buffer may be utilized to store a number of frames. A user may access frames stored in a frame buffer for display. If the method determines at a step 608 that the requested page is not in a frame buffer, then the method continues to a step 612. If the method determines at a step 608 that the requested page is in a frame buffer, then the method prints the requested page from the frame buffer at a step 610 whereupon the method ends.

Figure 7:
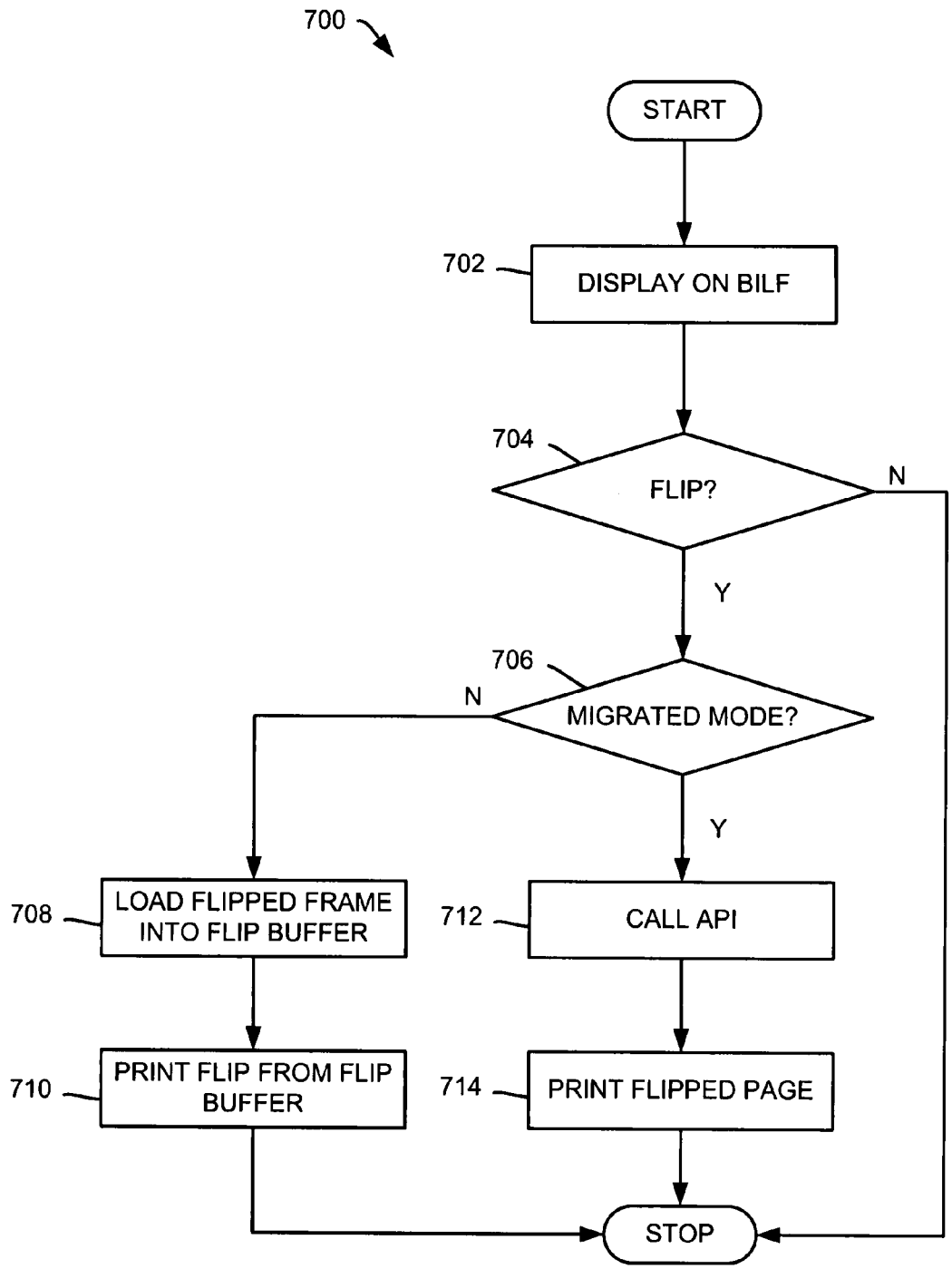
FIG. 7 is an illustrative flowchart for flipping an image on a BILF display in accordance with embodiments of the present invention.

FIG. 7 is an illustrative flowchart for flipping an image on a BILF display in accordance with embodiments of the present invention. As noted above, when an image is printed to a BILF display, the image is a bistable static image. That is, when printing, an image is captured at a moment in time and is not updated unless a user initiates an update. As such, flipping requires specialized handling to accommodate this characteristic. At a step 702, an image is being displayed on a BILF display. At a next step, 704 the method determines whether flipping is required. Flipping may be user initiated in any number of manners well-known in the art without departing from the present invention. For example, in an embodiment, a flipping button embodied in a physical or virtual interface may serve to provide flipping input. In some embodiments, flipping may be automated to correspond with a particular screen position. If the method determines at a step 704 that a flipping is not required, the method ends. If the method determines at a step 704 that flipping is required, the method determines whether the BILF display is in a migrated mode at a step 706. Migration is discussed in further detail above for FIG. 2. Notably, when a BILF display is in a migrated mode, the displayed application is navigable over the BILF display. When a BILF display is not in a migrated mode, then the displayed image is a static image which cannot be utilized to navigate an application.

If the method determines at a step 706 that the BILF display is in a migrated mode, then the method calls the application API at a step 712 to provide a flipped page. The method then prints the flipped page to the BILF display at a step 714 whereupon the method ends. In a migrated example, the BILF display is then refreshed at the display frequency rate. If the method determines at a step 706 that the BILF display is not in a migrated mode, then the method flips the current frame and loads a flipped frame of the current frame into a flip buffer at a step 708. In some embodiments, the flipped frame is loaded into a frame buffer. The method then prints the flipped frame from a flip buffer at a step 710 whereupon the method ends. Flipping a frame may have advantages in some portable electronic devices. For example, where a device may be opened to several positions to approximately 360°, flipping an image on a complementary display may provide a more convenient user experience.

Figure 8:
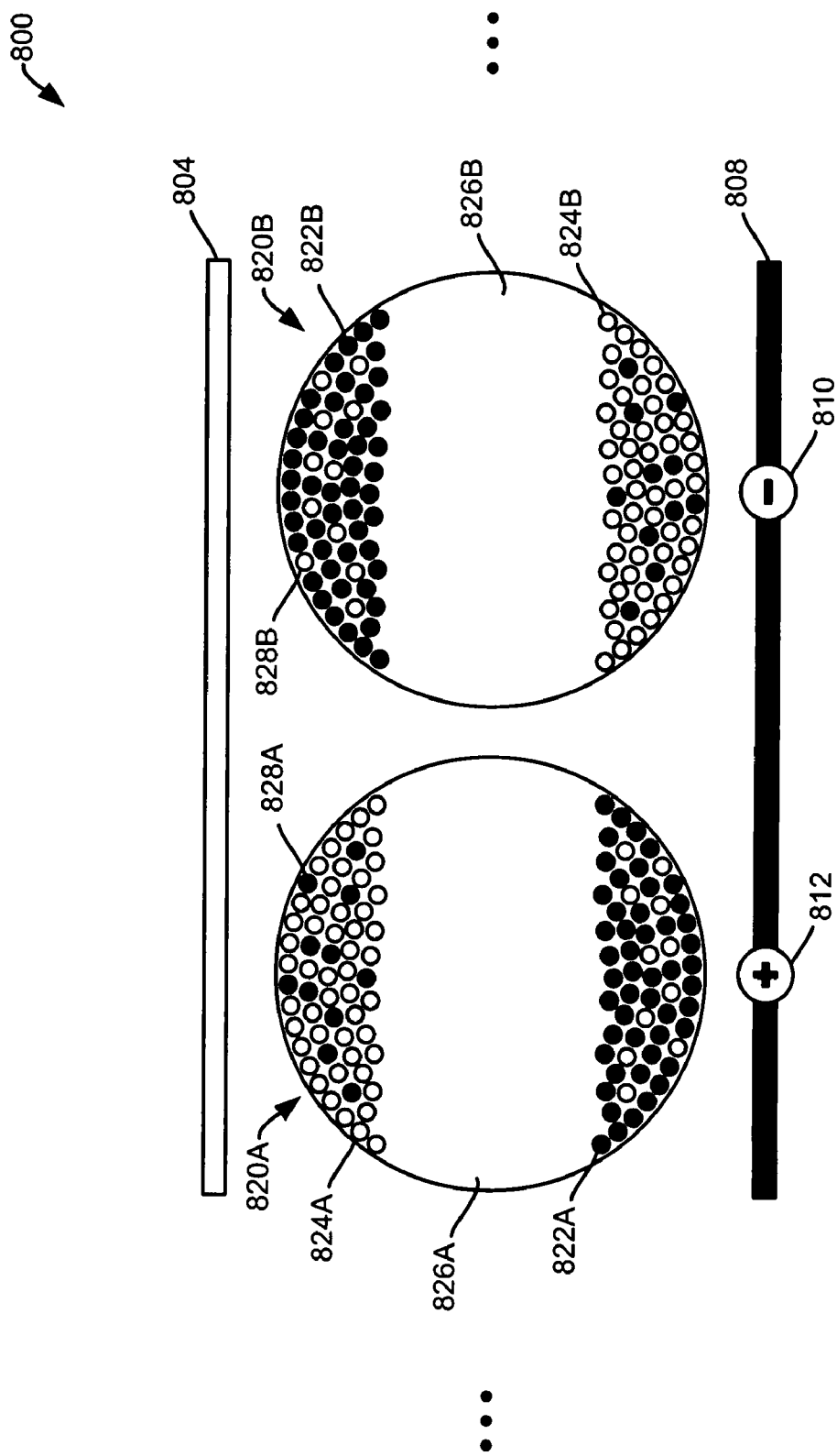
FIG. 8 is an illustrative representation of a portion of an electronic paper display (EPD) having a number of artifacts in accordance with embodiments of the present invention.

FIG. 8 is an illustrative representation of a portion of an electronic paper display (EPD) 800 having a number of artifacts in accordance with embodiments of the present invention. EPDs utilize a material called electronic ink and are commercially available under the trade name E INK®. Electronic ink includes millions of tiny microcapsules 820A and 820B, about the diameter of a human hair. In this example, each microcapsule 820A and 820B contains positively charged white particles 824A and 824B and negatively charged black particles 822A and 822B suspended in a clear fluid 826A and 826B. When a negative electric field is applied across top electrode 804 and bottom electrode 808, positively charged white particles 824A move to the top of microcapsule 820A where they become visible to the user. This makes the surface appear white at that spot. At the same time, an opposite electric field 812 pulls the negatively charged black particles 822A to the bottom of microcapsule 820A where they are hidden. By reversing this process and applying a positive electric field across top electrode 804 and bottom electrode 808, negatively charged black particles 822B appear at the top of microcapsule 820B, which now makes the surface appear dark at that spot. At the same time, an opposite electric field 810 pulls the positively charged white particles 824B to the bottom of microcapsule 820B where they are hidden. In some instances, some artifacts 828A and 828B may remain mixed with charged particles 824A and 822B. These artifacts may result in ghosting in some images which may render an image difficult or impossible to read. In order to remove artifacts, an image may cleaned by refreshing a displayed image.

Figure 9:
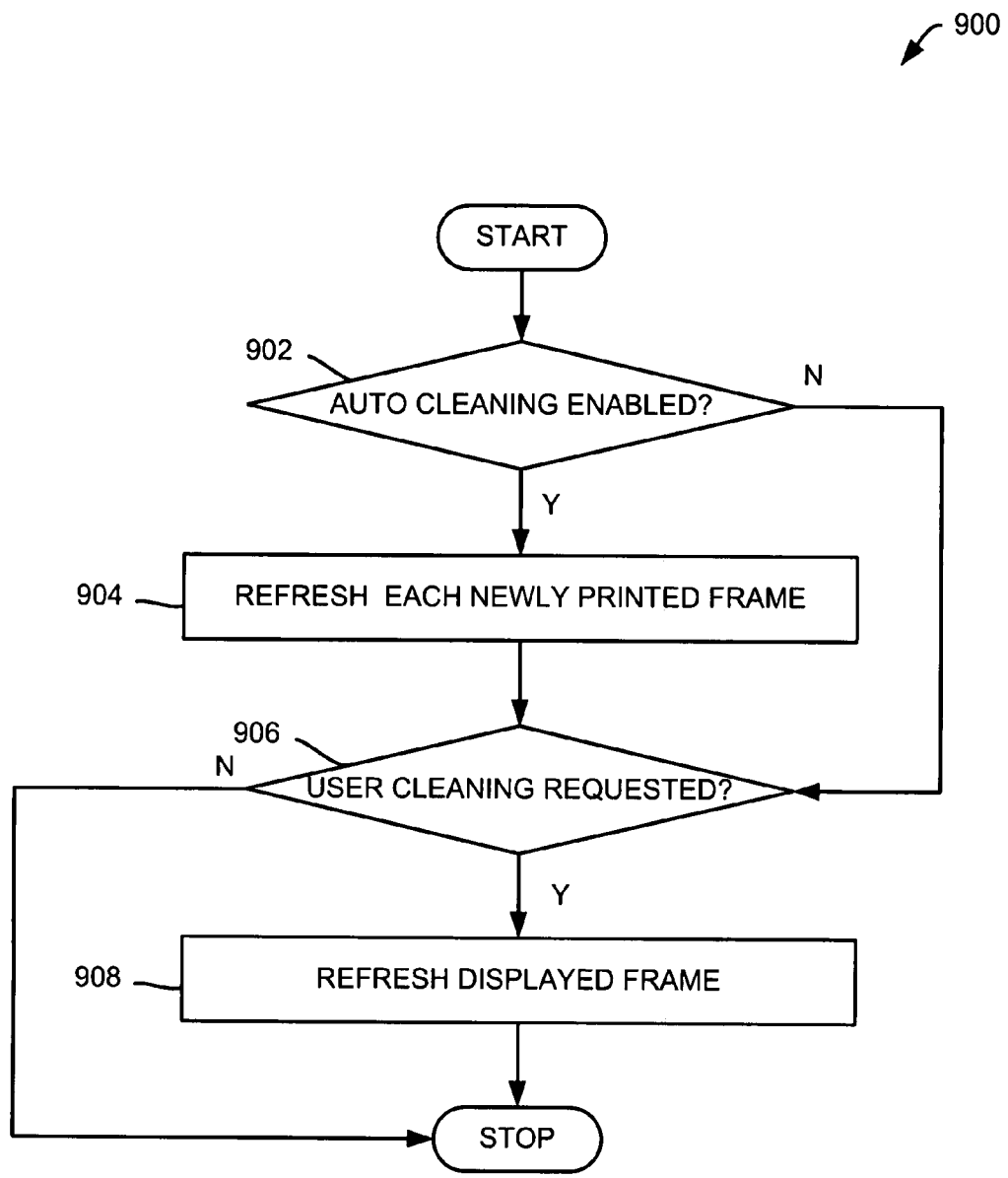
FIG. 9 is an illustrative flowchart for cleaning artifacts on a BILF display in accordance with embodiments of the present invention.

FIG. 9 is an illustrative flowchart 900 for cleaning artifacts on a BILF display in accordance with embodiments of the present invention. At a first step 902, the method determines whether auto cleaning is enabled. If the method determines that auto cleaning is enabled at a step 902, then the method refreshes each newly printed frame. Refreshing a printed frame (i.e. screen), in some embodiments, may be largely transparent to a user. That is, refreshing a screen may not, in some embodiments, clear the screen before an image is refreshed. In that example, a user may experience only a slight distortion in a displayed image on refresh; viewing would otherwise be unaffected. In other embodiments, the screen may be cleared before refresh. The method then continues to a step 906. If the method determines at a step 902 that auto cleaning is not enabled, the method continues to a step 906 to determine whether a user initiated clean is requested. A user may, in some embodiments, request a cleaning where artifacts have resulted in poor readability. Cleaning may be user initiated in any number of manners well-known in the art without departing from the present invention. For example, in an embodiment, a cleaning button embodied in a physical or virtual interface may serve to provide cleaning input. If the method determines at a step 906 that a user clean is requested, then the method refreshes the displayed frame at a step 908 whereupon the method ends. As noted above, refreshing a printed frame, in some embodiments, is largely transparent to a user. That is, refreshing a screen may not, in some embodiments, clear the screen before an image is refreshed. In that example, a user may experience only a slight distortion in a displayed image on refresh; viewing would otherwise be unaffected. In other embodiments, the screen may be cleared before refresh. If the method determines at a step 906 that a user clean is not requested, then the method ends.

Figure 10:
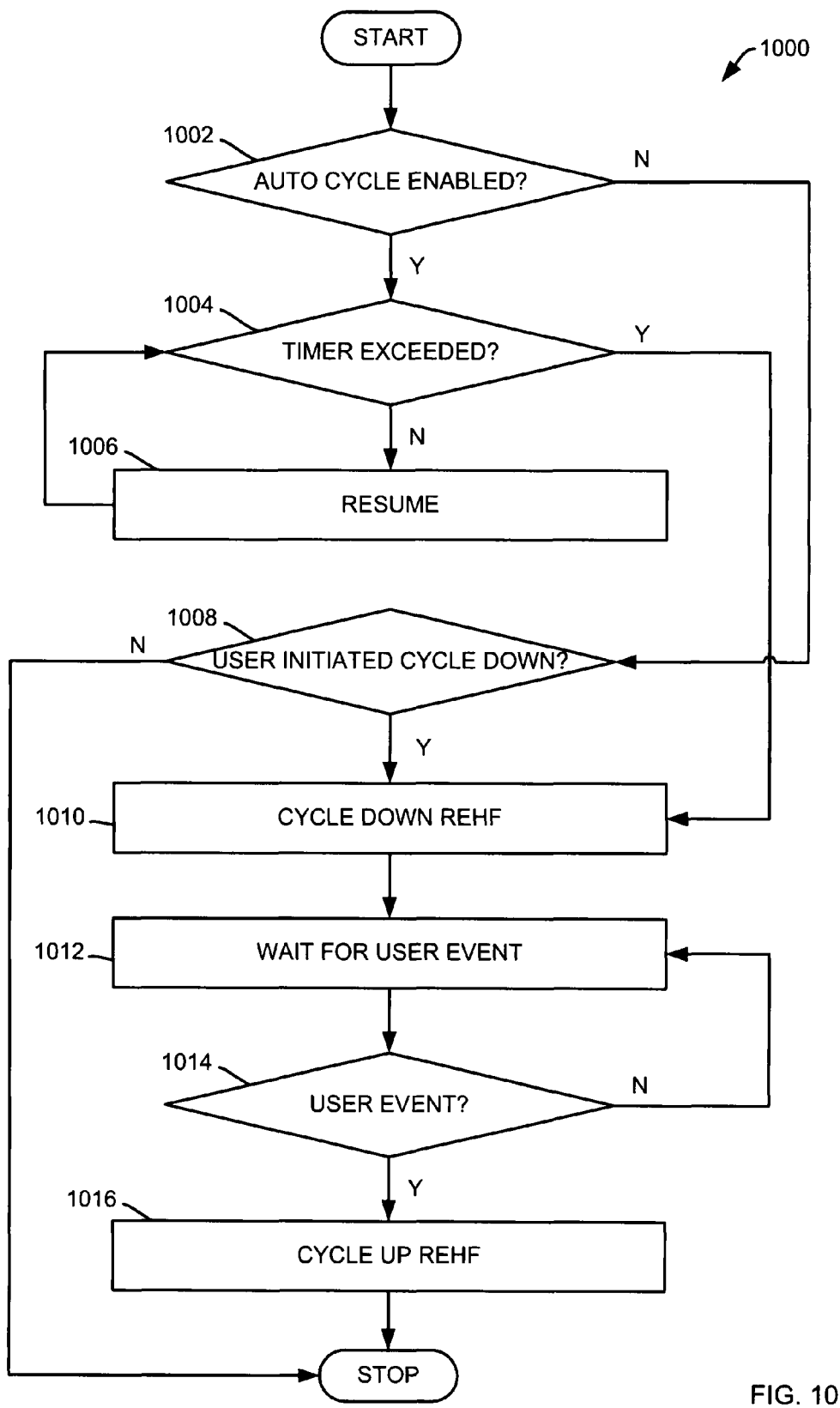
FIG. 10 is an illustrative flowchart for cycling a REHF display being utilized in connection with a BILF display in accordance with embodiments of the present invention.

FIG. 10 is an illustrative flowchart 1000 for cycling a REHF display being utilized in connection with a BILF display in accordance with embodiments of the present invention. Because some BILF displays include some power savings advantages, it may be useful to cycle down (turn off) power hungry REHF displays. As such, cycling an REHF display may be automated or user initiated without departing from the present invention. Thus, at a step 1002, the method determines whether auto cycle is enabled. If the method determines at a step 1002 that auto cycle is enabled, the method then determines whether a timer has been exceeded at a step 1004. In some embodiments, a timer may be set to a range of approximately 1 to 10 seconds. In other embodiments, a timer may be set to more than 10 seconds. If the method determines at a step 1004 that a timer has not been exceeded, then the method continues to a step 1006 to resume whereupon the method continues to a step 1004. If the method determines at a step 1004 that a timer has been exceeded, the method continues to a step 1010 to cycle down an REHF display. If the method determines at a step 1002 that auto cycle is not enabled, the method continues to a step 1008 to determine whether a user initiated cycle down is requested. Cycling down may be user initiated in any number of manners well-known in the art without departing from the present invention. For example, in an embodiment, a cycle down button embodied in a physical or virtual interface may serve to provide cycle down input. If the method determines at a step 1008 that a user initiated cycle down is not requested, the method continues to resume at a step 1006. If the method determines at a step 1008 that a user initiated cycle down is requested, the method continues to a step 1010 to cycle down a REHF display.

Once an REHF display is cycled down, a user may continue to view a complementary BILF display. As noted above, some actions may require application navigation features that are not available to a BILF display. This is particularly true where a BILF display is not in a migrated mode. Migration is discussed in further detail above for FIG. 2. When such an action occurs, then an REHF display may be cycled up. As such, at a step 1012, the method waits for a user event requiring a cycle up of an REHF display. At a step 1014, the method determines whether a user event requiring a cycle up of the REHF display has occurred. If the method determines at a step 1014 that a relevant user event has occurred, the method continues to cycle up an REHF at a step 1016 whereupon the method ends. If the method determines at a step 1014 that a relevant user event has not occurred, the method returns to a step 1012 to wait for a relevant user event.

In some embodiments, wiping a display may be desirable. In examples where sensitive information is being viewed, the ability to quickly wipe a semi-permanent display such as a BILF EPD. Wiping may be user initiated in any number of manners well-known in the art without departing from the present invention. For example, in an embodiment, a wipe button embodied in a physical or virtual interface may serve to provide wipe input. After a wipe, the BILF may be restored from an appropriate buffer.

In some embodiments, and BILF may be utilized to provide status information. Status information typically does not require high frequency refresh rates because the information displayed is read only and does not change at a high rate. Thus, status information may be continuously displayed without unduly burdening power supplies. Thus, status information like: power information, network connection information, signal strength information, user configuration information, display wakefulness information, date information, time information, application information, and system information may be displayed on a BILF in some embodiments.

While this invention has been described in terms of several preferred embodiments, there are alterations, permutations, and equivalents, which fall within the scope of this invention. It should also be noted that there are many alternative ways of implementing the methods and apparatuses of the present invention. Although various examples are provided herein, it is intended that these examples be illustrative and not limiting with respect to the invention. For example, in FIG. 1, steps 112, 114, and 116 are presented in a particular order. However, as may be appreciated, those steps may be performed in any order without departing from the present invention. Indeed, any steps which may be performed in any order are not intended to be limiting with respect to the manner in which they are presented herein. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for controlling complementary dual displays of an electronic device, the method comprising:
   executing an application on the electronic device, the application for viewing one or more pages of information on the device;
   generating a video signal by the application, wherein the video signal is part of a user interface for interacting with one or more pages of information displayed on the device;
   sending the video signal to a refresh-based high frame rate (REHF) display;
   displaying the video signal on the REHF display;
   generating a first frame by the application, the first frame comprising at least a portion of a first page of information;
   writing the first frame to a frame buffer associated with a bistable low frame rate (BILF) display;
   displaying the first frame from the frame buffer on the BILF display;
   receiving a user selection via the user interface displayed on the REHF display, the user selection to display an intermediate location within the first page of information currently displayed on the BILF display;

generating a second frame based on the user selection, the second frame different from the first frame and comprising at least a portion of the first page of information corresponding to the intermediate location;

writing the second frame to the frame buffer associated with the BILF display;

displaying the second frame from the frame buffer on the BILF display;

generating a second video signal by the application, wherein the second video signal comprises a feedback signal to update the REHF display and is generated based at least in part on the second frame, the feedback signal indicative of the display of the second frame on the BILF display; and sending the second video signal to the REHF display to update the REHF display.

2. The method of claim 1 wherein the second video signal is sent over a wireless connection.

3. The method of claim 2 wherein the wireless connection is selected from the group consisting of: Bluetooth, 802.11a, 801.11b, 802.11g, 2.4 GHz wireless, IR wireless, and ultra wide band.

4. The method of claim 1 wherein a first plurality of commands from the application are accessed from the REHF display and the BILF display.

5. The method of claim 1 further comprising:
on a clean command for the BILF display, refreshing a current frame such that artifacts are reduced.

6. The method of claim 5 further comprising:
before the refreshing, clearing the current frame.

7. The method of claim 5 wherein the clean command is configured to execute each time a new frame is displayed.

8. The method of claim 1 further comprising:
on a wipe command for the BILF display, wiping the BILF display such that the BILF display is blank.

9. The method of claim 1 wherein the second video signal includes status information.

10. The method of claim 9 wherein the status information is selected from the group consisting of: power information, network connection information, signal strength information, user configuration information, display wakefulness information, date information, time information, application information, and system information.

11. The method of claim 1 wherein the portion of the first plurality of commands is selected from the group consisting of: a migrate command, a pagination command, a zoom command, a session termination command, a search command, a clear command, and a display selection command.

12. The method of claim 1 wherein the application is controllable from the REHF display when the BILF display is connected with the electronic device.

13. The method of claim 4 wherein the first application and the second application are controllable from the REHF display when the BILF display is connected with the electronic device.

14. The method of claim 1 wherein the first video signal is automatically converted to provide a best first display color and a best first display resolution of the REHF display and the second video signal is automatically converted for a best second display color and a best second display resolution of the BILF display.

15. The method of claim 1 further comprising:
cycling down the REHF display on a cycle down command, wherein the cycle down command is in response to a first user input;

cycling down the REHF display after a cycle down time interval if the first input is not received within the cycle down time interval; and cycling up the REHF display on a cycle up command, wherein the cycle up command is in response to a second user input.

16. The method of claim 15 wherein the cycle down time interval is in a range of approximately 1 to 10 seconds.

17. The method of claim 1, wherein the video signal displayed on the REHF display is part of a user interface for searching within one or more pages of information displayed on the BILF display, and wherein the user selection comprises a search query.

18. The method of claim 17, further comprising, wherein the second frame displayed on the BILF display comprises a page of information that contains an occurrence of the search query.

19. The method of claim 1, wherein the video signal displayed on the REHF display is part of a user interface for navigating one or more pages of information displayed on the BILF display, and wherein the user selection comprises user input to navigate to a different location within the one or more pages of information.

20. The method of claim 19, wherein the second frame displayed on the BILF display comprises a page of information at the different location specified by the user selection.

21. The method of claim 19, wherein the interface for navigating the one or more pages of information comprises a table of contents for the one or more pages of information.

22. An electronic device comprising:
a refresh-based high frame rate (REHF) display;
a bistable low frame rate (BILF) display; and
a processor coupled to the REHF display and the BILF display, wherein the processor is configured to:
execute an application for viewing one or more pages of information on the device,
generate a video signal based on instructions in the application, wherein the video signal is part of a user interface for interacting with one or more pages of information displayed on the device,
send the video signal to the REHF display,
display the video signal on the REHF display,
generate a first frame based on instructions in the application, the first frame comprising at least a portion of a first page of information,
write the first frame to a frame buffer associated with the BILF display,
display the first frame from the frame buffer on the BILF display,
receive a user selection via the user interface displayed on the REHF display, the user selection to display an intermediate location within the first page of information currently displayed on the BILF display,
generate a second frame based on the user selection, the second frame different from the first frame and comprising at least a portion of the first page of information corresponding to the intermediate location,
write the second frame to the frame buffer associated with the BILF display,
display the second frame from the frame buffer on the BILF display,
generate a second video signal based on instructions in the application, wherein the second video signal comprises a feedback signal to update the REHF display and is generated based at least in part on the second frame, the feedback signal indicative of the display of the second frame on the BILF display; and sending the second video signal to the REHF display to update the REHF display.

23. The electronic device of claim 22, wherein the video signal is part of a user interface for searching within one or more pages of information displayed on the BILF display, and wherein the user selection comprises a search query.

24. The electronic device of claim 23, wherein the second frame comprises a page of information that contains an occurrence of the search query.

25. The electronic device of claim 22, wherein the video signal is part of a user interface for navigating one or more pages of information displayed on the BILF display, and wherein the user selection comprises user input to navigate to a different location within the one or more pages of information.

26. The electronic device of claim 25, wherein the second frame comprises a page of information at the different location specified by the user selection.

27. The electronic device of claim 25, wherein the interface for navigating the one or more pages of information comprises a table of contents for the one or more pages of information.

28. A computer program product for controlling complementary dual displays for use with an electronic device, the computer program product comprising a non-transitory computer-readable storage medium containing computer program code for:

generating a video signal, wherein the video signal is part of a user interface for interacting with one or more pages of information displayed on the device;

sending the video signal to a refresh-based high frame rate (REHF) display, wherein the REHF display is configured to display the video signal;

generating a first frame, the first frame comprising at least a portion of a first page of information;

writing the first frame to a frame buffer associated with a bistable low frame rate (BILF) display, wherein the BILF display is configured to display the first frame from the frame buffer;

receiving a user selection via the user interface displayed on the REHF display, the user selection to display an intermediate location within the first page of information currently displayed on the BILF display;

generating a second frame based on the user selection, the second frame different from the first frame and comprising at least a portion of the first page of information corresponding to the intermediate location;

writing the second frame to the frame buffer associated with the BILF display, wherein the BILF display is configured to display the second frame from the frame buffer, generating a second video signal, wherein the second video signal comprises a feedback signal to update the REHF display and is generated based at least in part on the second frame, the feedback signal indicative of the display of the second frame on the BILF display; and sending the second video signal to the REHF display to update the REHF display.

29. The computer program product of claim 28, wherein the video signal is part of a user interface for searching within one or more pages of information displayed on the BILF display, and wherein the user selection comprises a search query.

30. The computer program product of claim 29, wherein the second frame comprises a page of information that contains an occurrence of the search query.

31. The computer program product of claim 28, wherein the video signal is part of a user interface for navigating one or more pages of information displayed on the BILF display, and wherein the user selection comprises user input to navigate to a different location within the one or more pages of information.

32. The computer program product of claim 31, wherein the second frame comprises a page of information at the different location specified by the user selection.

33. The computer program product of claim 31, wherein the interface for navigating the one or more pages of information comprises a table of contents for the one or more pages of information.

* * * * *